(12) United States Patent
Edwards

(10) Patent No.: US 9,582,033 B2
(45) Date of Patent: Feb. 28, 2017

(54) APPARATUS FOR PROVIDING A TABLET CASE FOR TOUCH-SENSITIVE DEVICES

(71) Applicant: McKesson Financial Holdings, Hamilton (BM)

(72) Inventor: Cliff Edwards, Delta, CA (US)

(73) Assignee: McKesson Corporation, San Francisco, CA (US)

( * ) Notice: Subject to any disclaimer, the term of this patent is extended or adjusted under 35 U.S.C. 154(b) by 614 days.

(21) Appl. No.: 13/687,674

(22) Filed: Nov. 28, 2012

(65) Prior Publication Data

US 2014/0145967 A1    May 29, 2014

(51) Int. Cl.
G06F 3/041    (2006.01)
G06F 1/16    (2006.01)
G06F 3/039    (2013.01)
G06F 3/0488    (2013.01)

(52) U.S. Cl.
CPC ............ *G06F 1/1628* (2013.01); *G06F 3/039* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 5,943,044 A * | 8/1999 | Martinelli et al. ............ | 345/174 |
| 7,054,441 B2 * | 5/2006 | Pletikosa ............. | G06F 1/1626 361/679.24 |
| 8,767,385 B2 * | 7/2014 | Richardson et al. ...... | 361/679.3 |
| 2003/0098803 A1 * | 5/2003 | Gourgey et al. ................ | 341/21 |
| 2003/0184958 A1 * | 10/2003 | Kao ............................... | 361/683 |
| 2004/0056781 A1 * | 3/2004 | Rix et al. ......................... | 341/20 |
| 2006/0256090 A1 * | 11/2006 | Huppi ........................... | 345/173 |
| 2007/0247793 A1 * | 10/2007 | Carnevali ..................... | 361/681 |
| 2007/0296694 A1 * | 12/2007 | Kim et al. .................... | 345/156 |
| 2009/0217164 A1 * | 8/2009 | Beitle et al. ................... | 715/702 |
| 2010/0066690 A1 * | 3/2010 | Beamish ............ | G06F 3/03547 345/173 |
| 2010/0271324 A1 * | 10/2010 | Hayes .......................... | 345/173 |
| 2011/0215914 A1 | 9/2011 | Edwards | |
| 2011/0216015 A1 | 9/2011 | Edwards | |
| 2012/0268911 A1 * | 10/2012 | Lin .............................. | 361/807 |

* cited by examiner

*Primary Examiner* — Kent Chang
*Assistant Examiner* — Benjamin Morales Fernandez
(74) *Attorney, Agent, or Firm* — Alston & Bird LLP

(57) ABSTRACT

An apparatus is provided that includes a case for securing an overlay template and a touch-sensitive surface in an aligned relationship. The case is configured to receive an overlay template and a touch-sensitive surface. The case includes at least one opening enabling access to a sensing area of the touch-sensitive surface in which an object comes into contact. The touch-sensitive surface is divided into a plurality of regions associated with respective functions of a software application. The overlay template depicts the regions and a layout of the regions into which the touch-sensitive surface is divided. The case is configured to securely hold the received touch-sensitive surface and the overlay template in place in an instance in which the overlay template is placed on the touch-sensitive surface while inserted in the case.

15 Claims, 16 Drawing Sheets

APPARATUS FOR PROVIDING A TABLET CASE FOR TOUCH-SENSITIVE DEVICES

TECHNOLOGICAL FIELD

Embodiments of present invention relate generally to a user interface and methods for interacting with a computer system, and more particularly, to a touch-based user interface and a user interface case for securely holding the touch-based user interface.

BACKGROUND

In the field of medical imaging, prior to the digitization of medical imaging, medical-imaging users (e.g., radiologists) would analyze physical film printed images in light boxes, and use physical devices such as magnifying glasses, rulers, grease pencils, and their hands to manipulate the physical printed medical images in order to interpret and diagnose the images. With the digitization of medical imaging, the physical film became a digital image, displayable on a computer monitor. A medical-imaging system became a computer application or collection of computer applications, which require a computer or computers to operate. At present, users interact with medical-imaging systems through a mouse and keyboard. Commands to the medical-imaging system are typically invoked through mouse and/or keyboard interactions.

For instance, at present, radiologists typically want their Picture Archiving and Communication System (PACS) diagnostic workstation interaction to be as efficient as possible, with significant interest in shaving as little as a few seconds off the completion time of reading an image study for a patient. The radiologists also typically desire the interface to be comfortable for long periods of use to avoid fatigue that may lead to repetitive stress injuries (RSI). While the mouse has been a remarkably useful graphical user interface (GUI) interaction device, it is not without issues for highly repetitive image and graphics intensive use. Radiologists often perform the same image navigation and manipulation tasks such as scrolling a stack of images, zooming and panning images and adjusting image window and level hundreds of times a day. This may lead to mouse related fatigue, and in severe cases RSI. The PACS diagnostic workstation software typically relies on standard GUI conventions such as drop down menus, graphical tools, and keyboard and/or mouse shortcuts which may not be the most efficient approach for these common image operations.

In this regard, for image-intensive computing with rich graphical user interfaces, the mouse is showing its age. The mouse constrains the interaction to a single x, y point on the display with buttons to make selections and initiate modes of operation, such as click and drag. Most modern computer mice also have a special purpose scroll mechanism, often a wheel. Much of the human hand and finger capabilities and dexterity are not utilized with a mouse, and a mouse is limited to only one hand. Using the mouse for long periods of time tends to cause fatigue and repetitive stress symptoms due to the need to grasp the device and repeatedly perform small stressing motions of the fingers to click buttons.

For alphanumeric text entry, and initiating commands, keyboards have remained much the same for many decades and it has been difficult to find alternatives that perform better at text entry, for most users. When used as an input device for medical-imaging systems, some form of keyboard may remain in use for text entry for a long time to come. However, another common purpose for which keyboards are used with medical-imaging systems is for shortcuts to operations generally also available with the mouse but at the cost of navigation time and additional mouse clicking. The trade-off with mapping functions to keyboard shortcuts is the user has to learn and remember non-intuitive mappings of functions to keys, and most people have trouble remembering more than a few.

To address some of the drawbacks associated with using a mouse and keypad, tablet devices are currently being utilized for multitouch input to control image operations. For workstation computers primarily dedicated to a singular purpose, such as a diagnostic medical imaging workstation, a computer aided design workstation, a graphic art workstation, or a scientific computing workstation, the use of such a multitouch tablet can be enhanced with an overlay that physically divides the sensing surface of the tablet into various shaped regions. While the overlay is useful, the overlay may inadvertently move relative to the sensing surface of the underlying tablet, thereby causing the overlay to become misaligned. Some users may tape the overlay onto the tablet. However, this approach may be burdensome to the user (e.g., a radiologist) and result in user dissatisfaction. In addition, taping the paper or plastic overlay over the tablet may be an unsatisfactory long term solution.

BRIEF SUMMARY

In light of the foregoing background, exemplary embodiments of the present invention provide an apparatus for maintaining an overlay template in position relative to a tablet. In this regard, the apparatus of one embodiment may include a case that maintains an overlay template in position with respect to a tablet. While the case of an example embodiment may maintain the overlay template in position for any length of time, the case also advantageously allows for the quick removal and/or replacement of the overlay template, when needed. As such, the apparatus of an example embodiment of the present invention may facilitate a user's interaction with the tablet.

In one example embodiment, an apparatus is provided that includes a case for securing an overlay template and a touch-sensitive surface in an aligned relationship. The case is configured to receive an overlay template and a touch-sensitive surface. The case defining at least one opening enabling access to a sensing area of the touch-sensitive surface with which an object comes into contact. The touch-sensitive surface is divided into a plurality of regions associated with respective functions of a software application. The overlay template defines the regions and a layout of the regions into which the touch-sensitive surface is divided. The case is configured to securely hold the received touch-sensitive surface and the overlay template in an aligned relationship with one another.

In another example embodiment, an apparatus is provided that includes a touch sensitive surface that is divided into a plurality of regions associated with respective functions of a software application. The apparatus further includes an overlay template and a case configured to receive the overlay template and the touch-sensitive surface. The case defining at least one opening enabling access to a sensing area of the touch-sensitive surface with which an object comes into contact. The overlay template defines the regions and a layout of the regions into which the touch-sensitive surface is divided. The case is configured to securely hold the received touch-sensitive surface and the overlay template in an aligned relationship with one another.

Exemplary embodiments of the present invention therefore provide an apparatus including a case that secures an overlay template to a touch-sensitive device which enables interaction with a software application via a touch-sensitive surface of the touch-sensitive device, which is divided into regions associated with respective functions by the overlay template. As indicated above, and explained below, exemplary embodiments of the present invention may solve problems identified by prior techniques and provide additional advantages.

BRIEF DESCRIPTION OF THE DRAWINGS

Figure 1A:
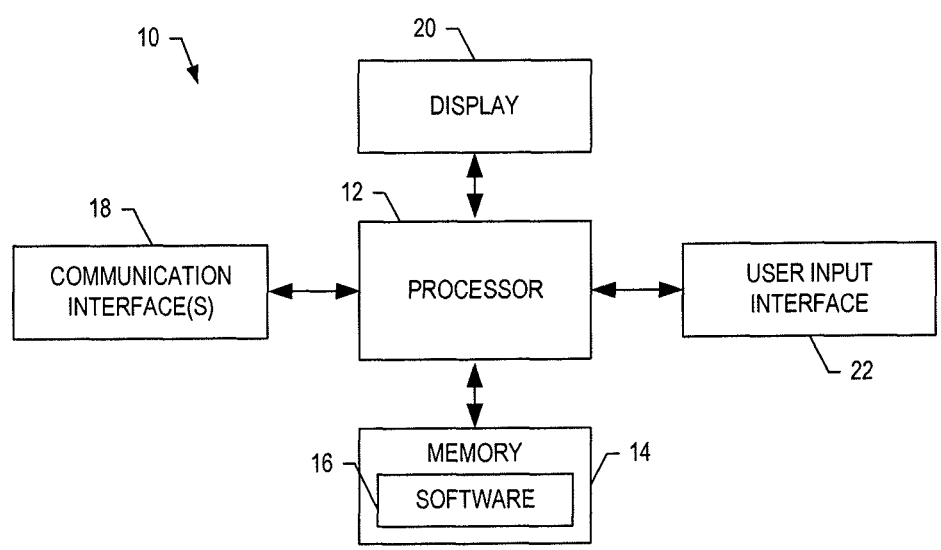
Figure 1B:
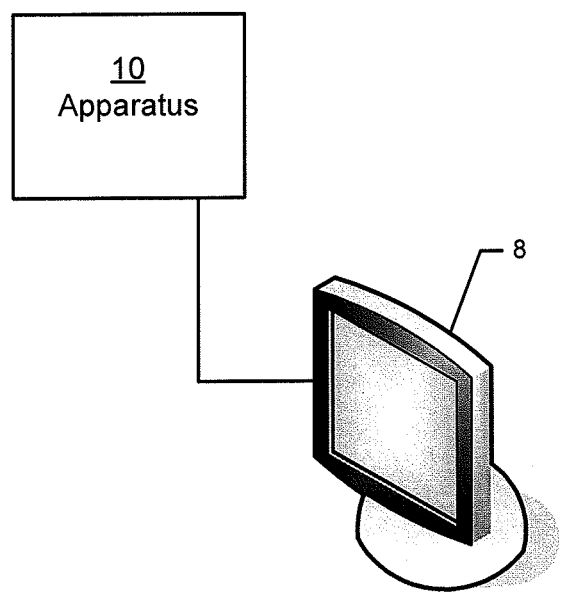
Figure 2A:
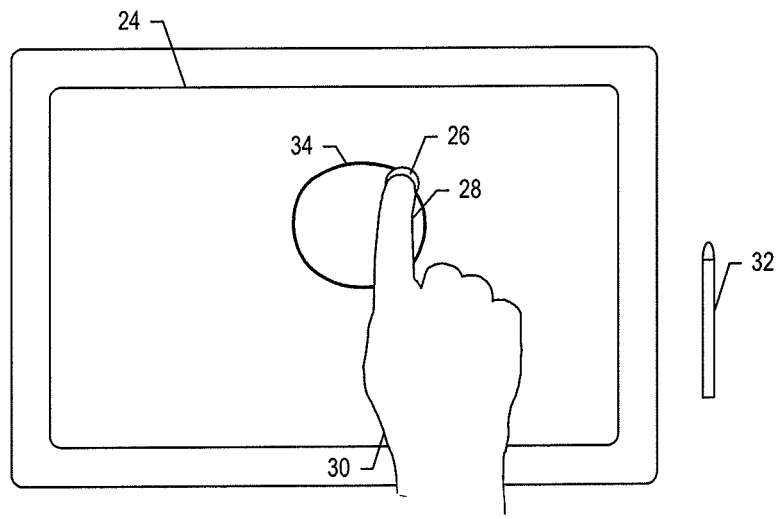
Figure 2B:
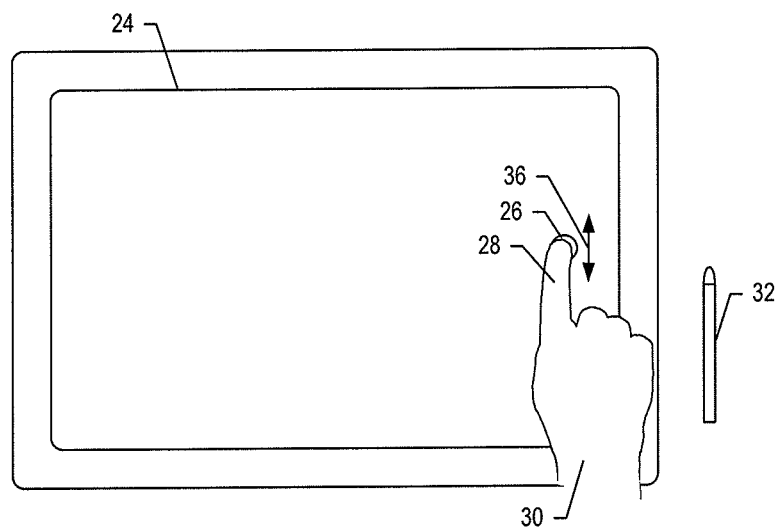
Figure 3:
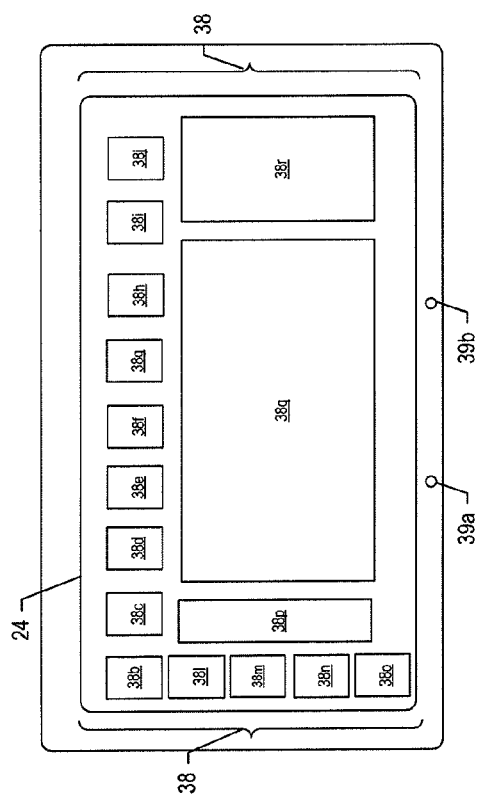
Figure 4:
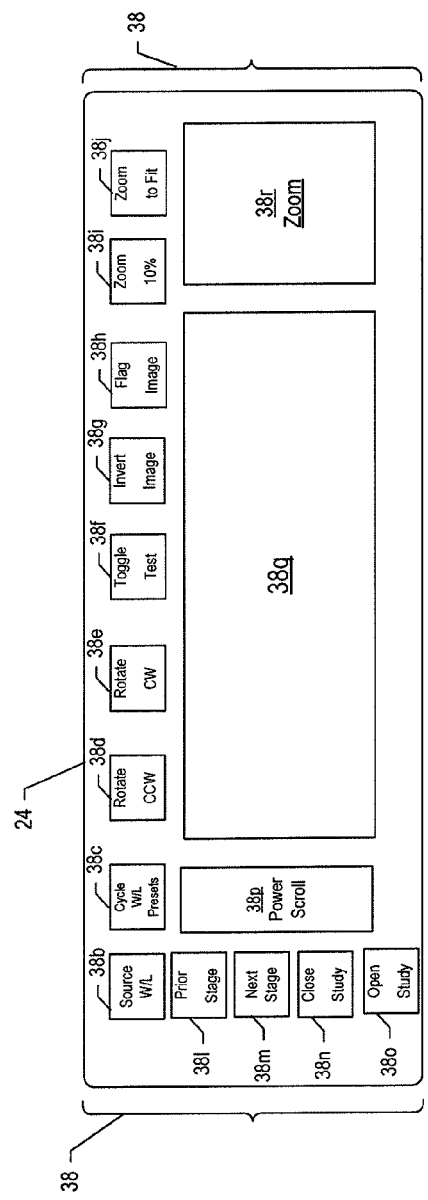
Figure 5A:
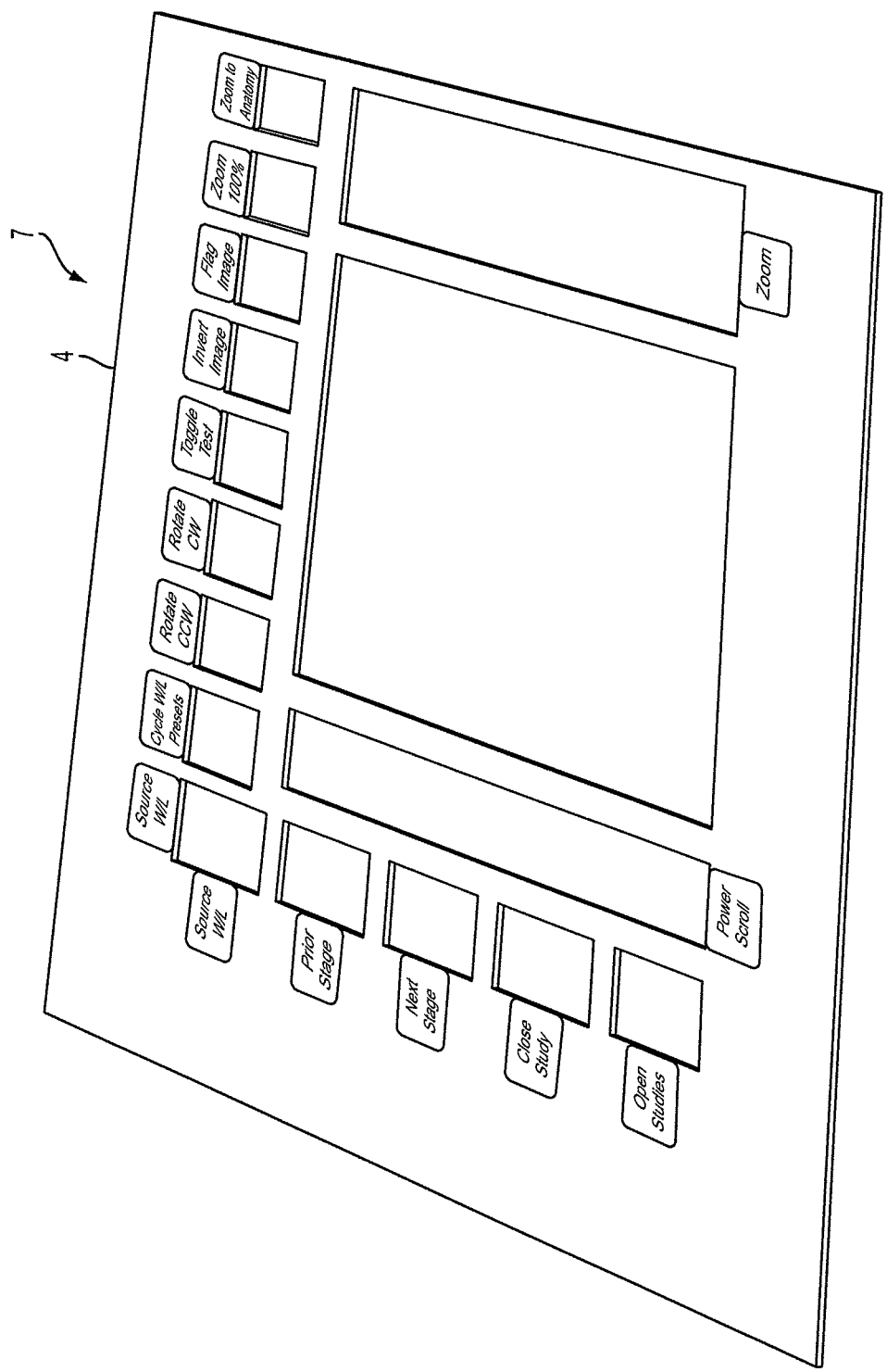
Figure 5B:
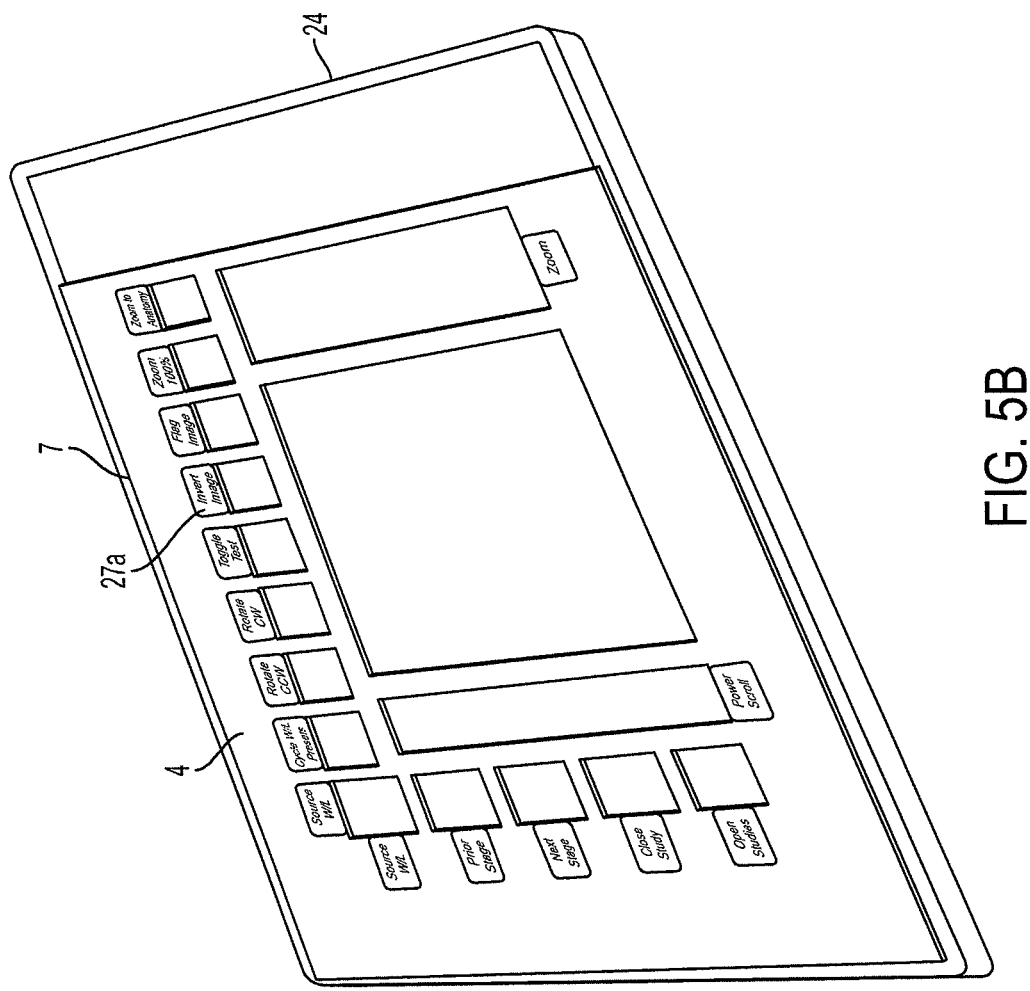
Figure 6:
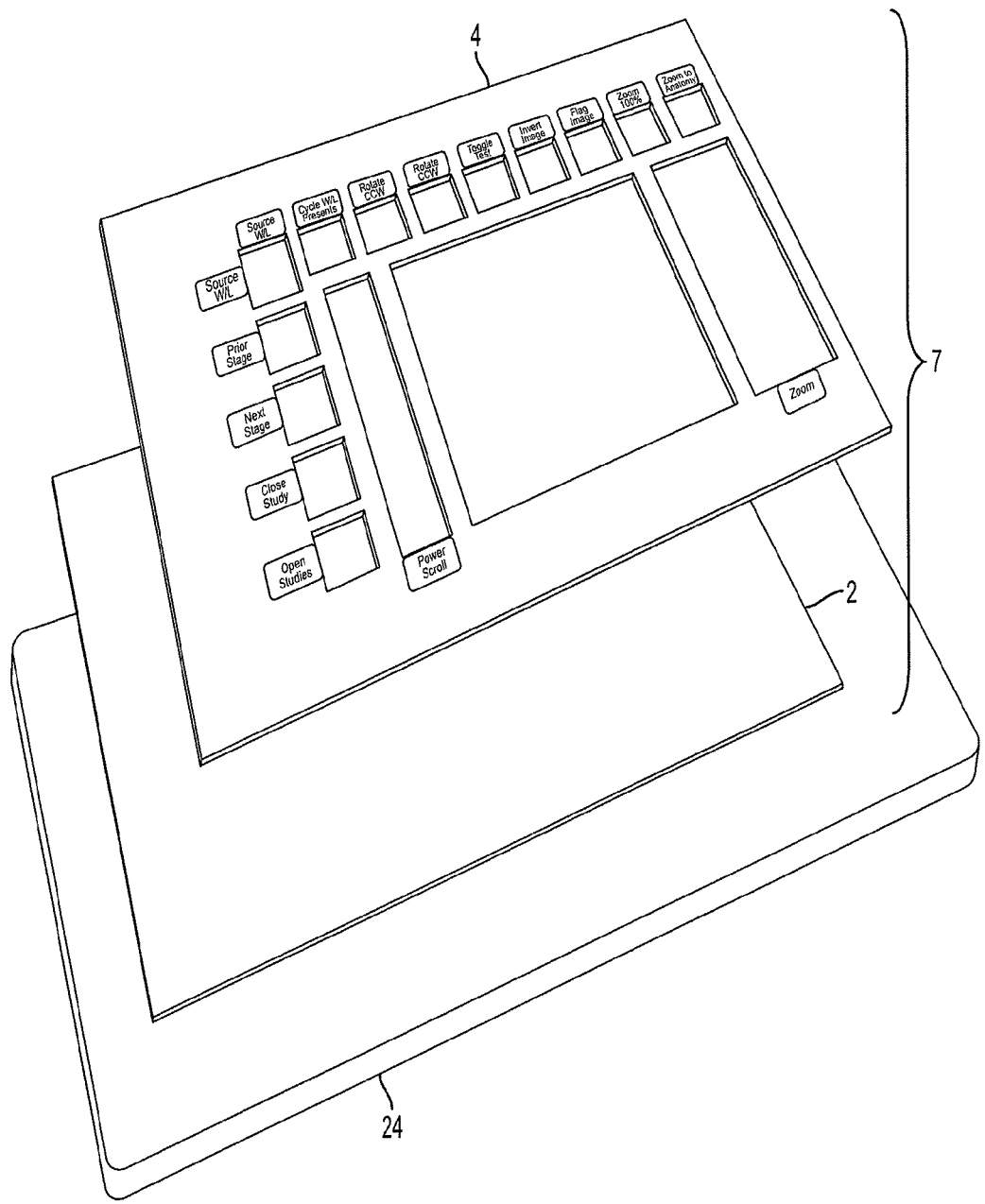
Figure 7:
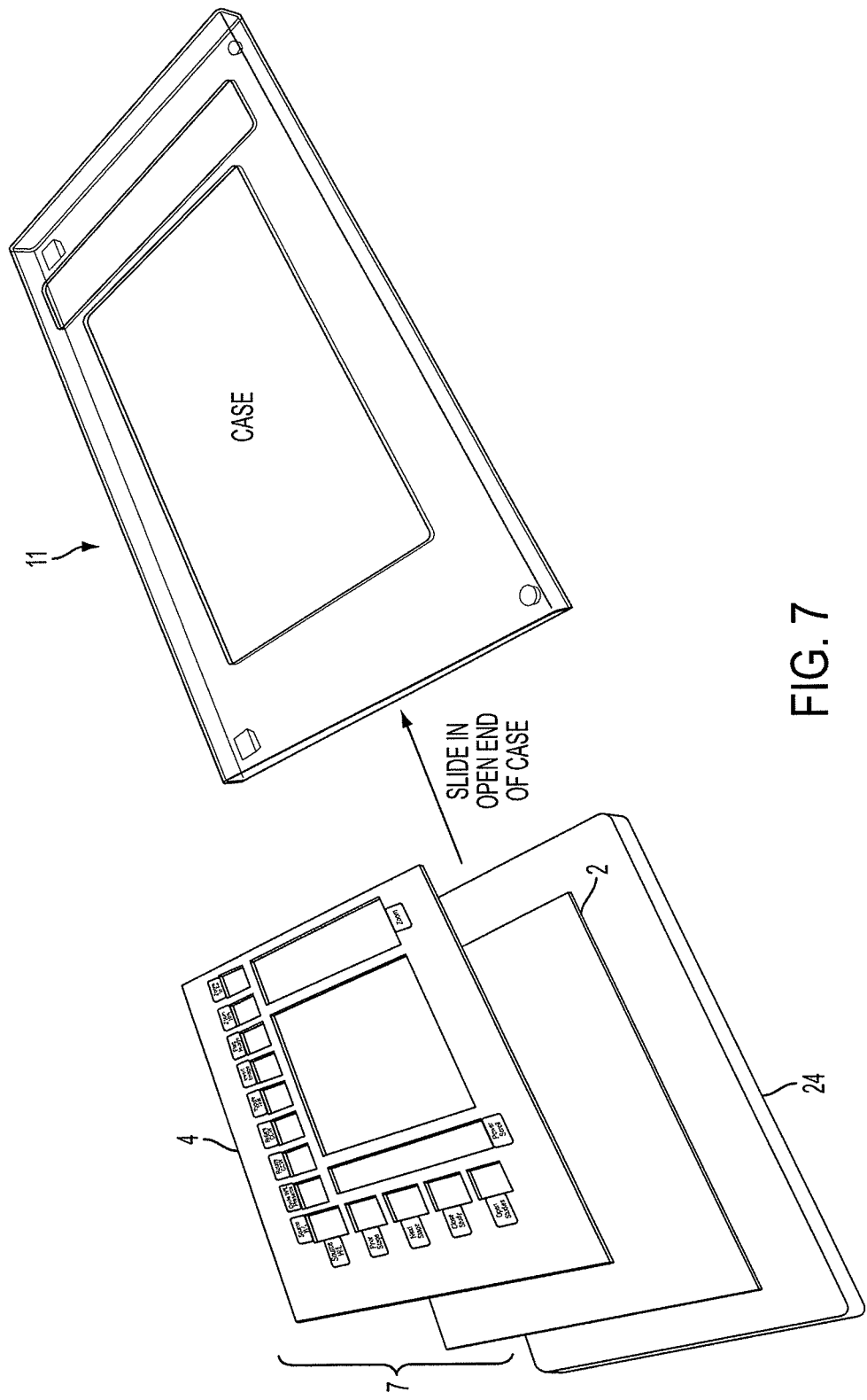
Figure 8:
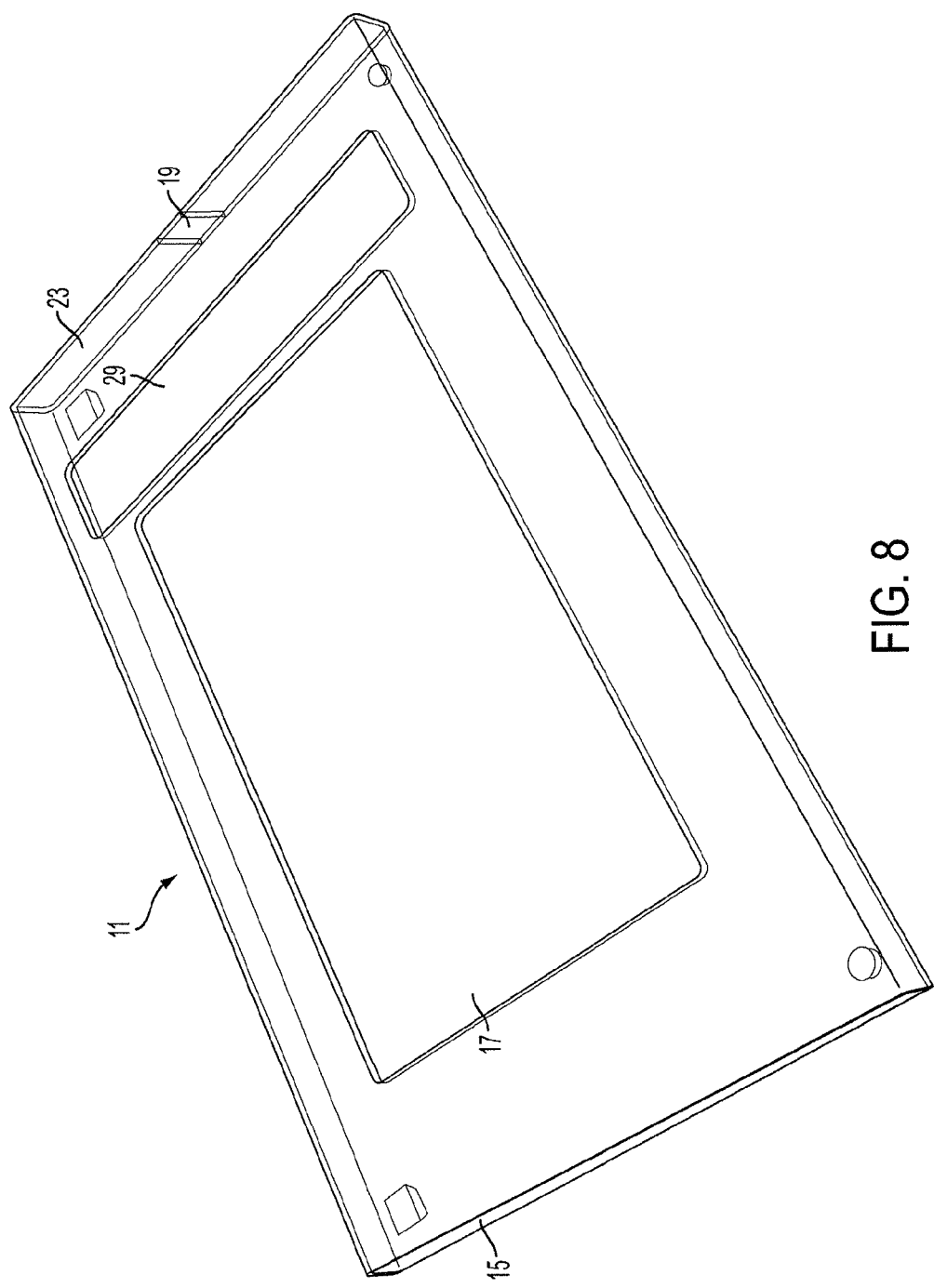
Figure 9:
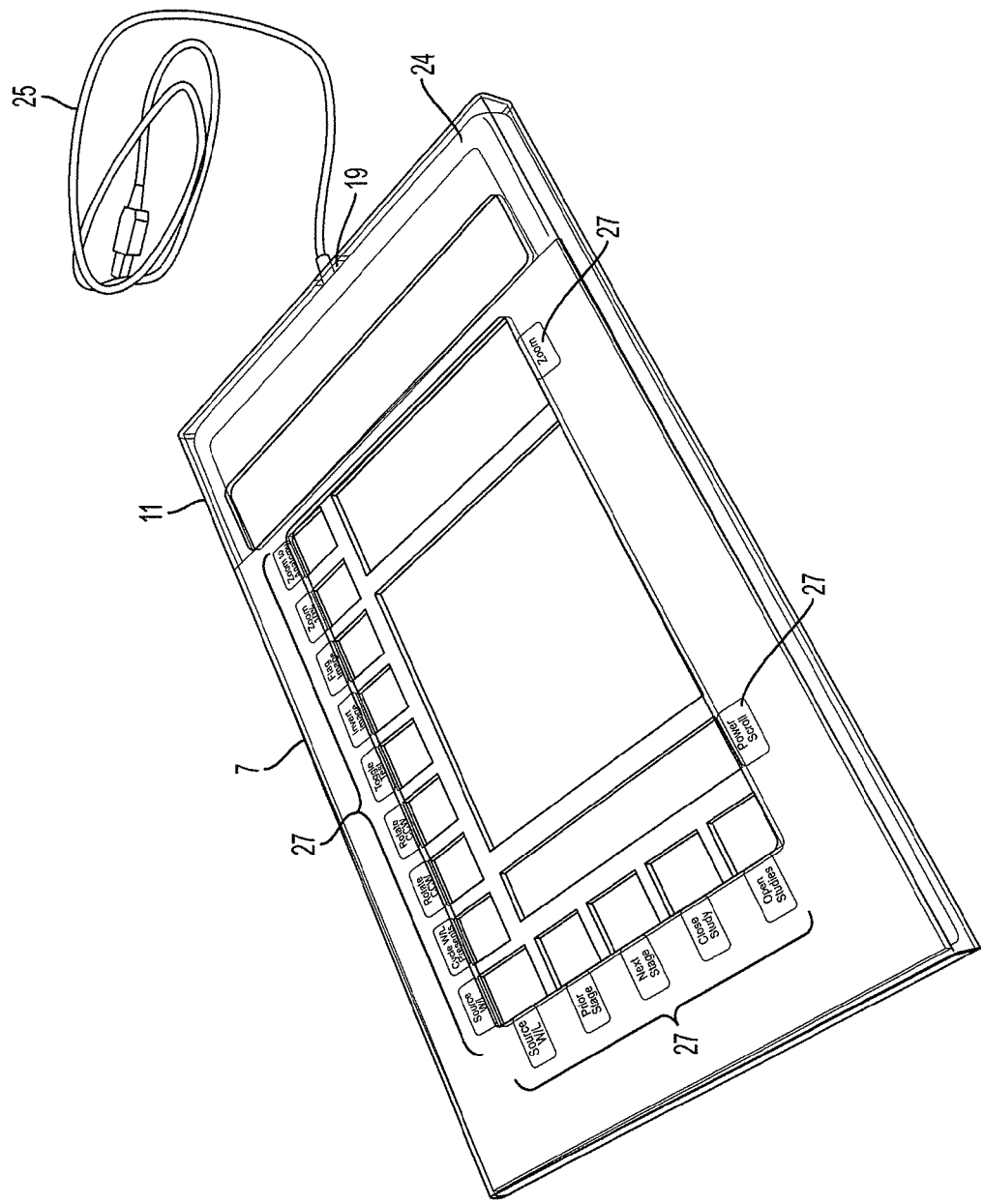
Figure 10:
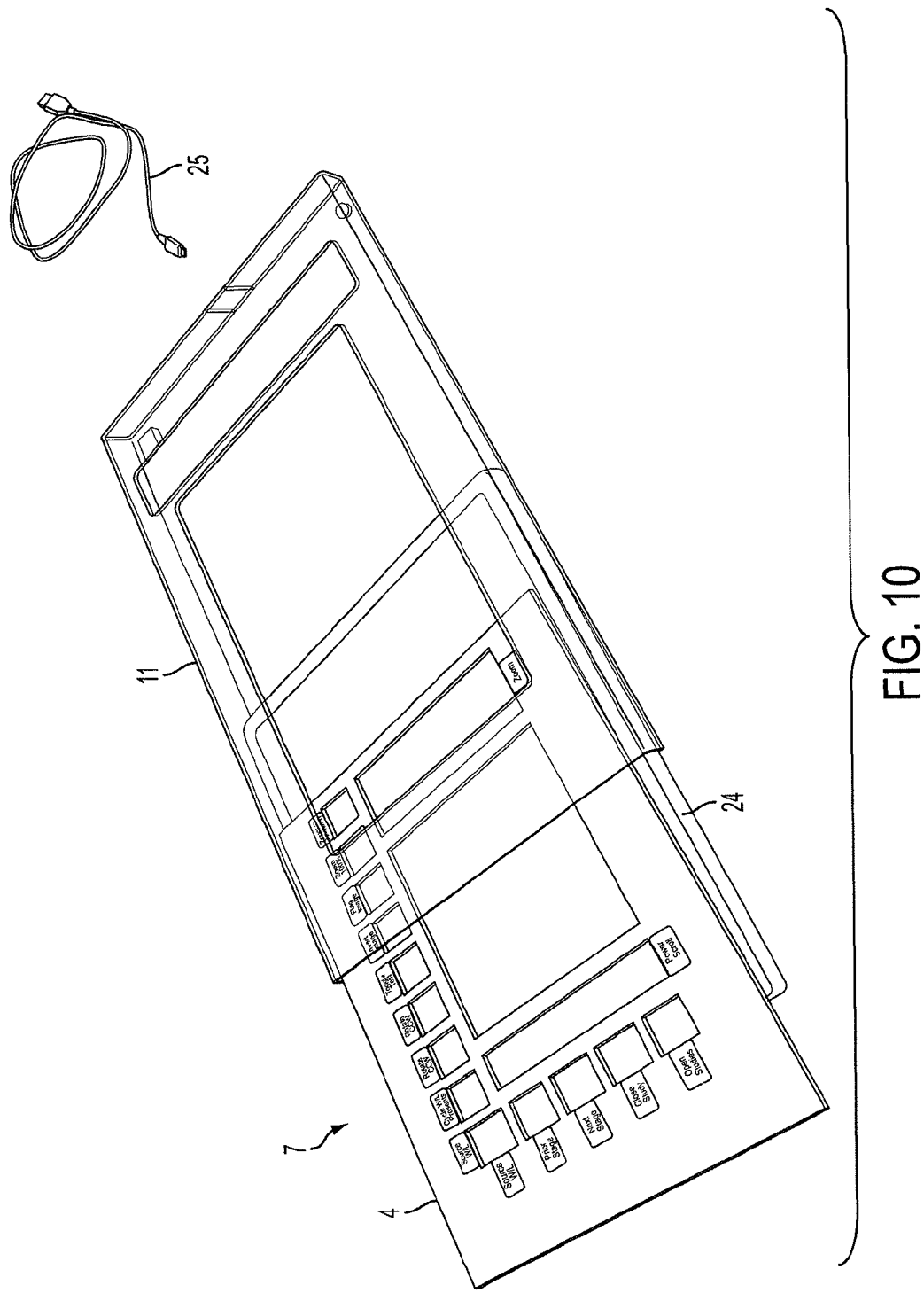
Figure 11:
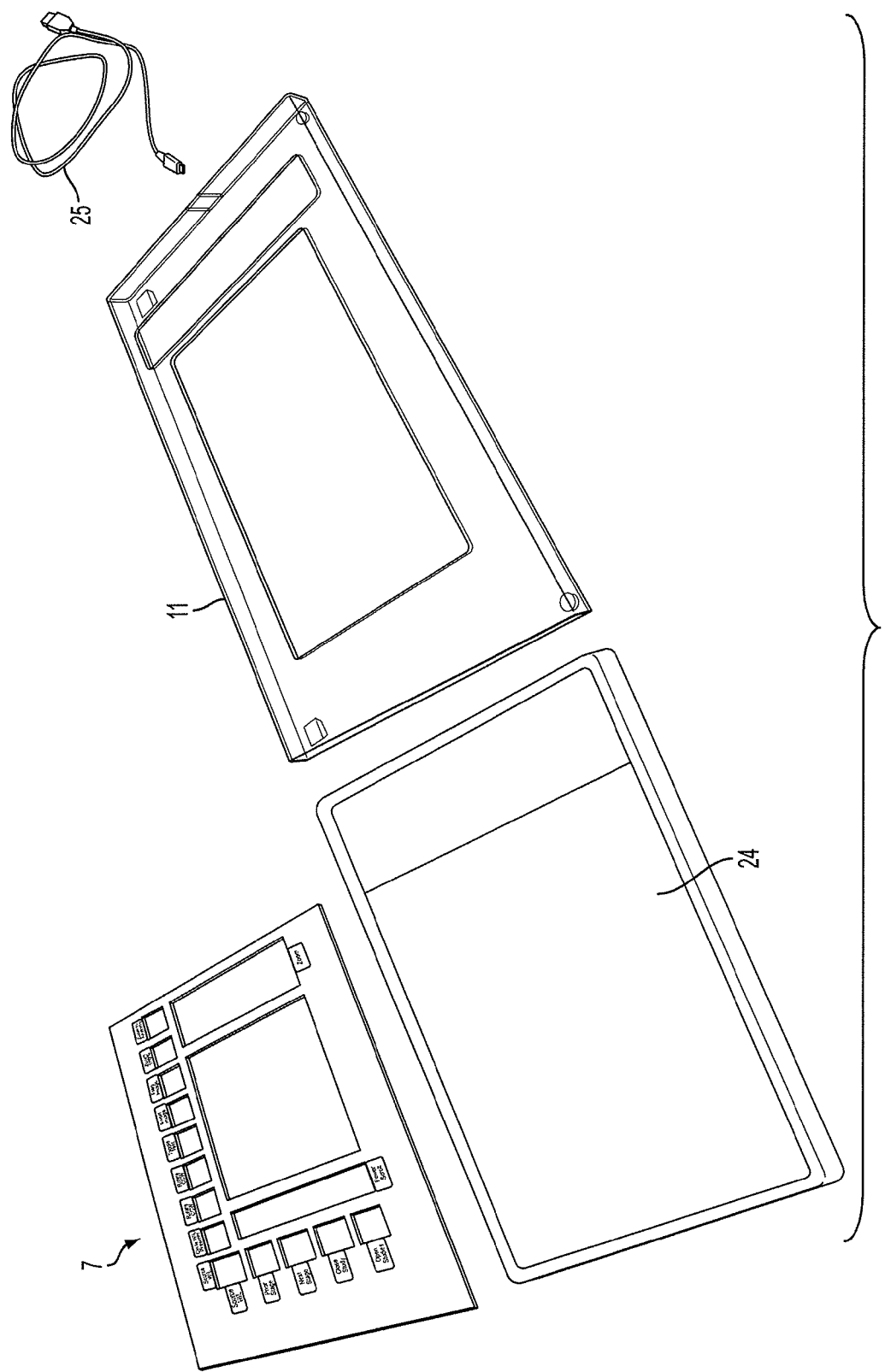
Figure 12:
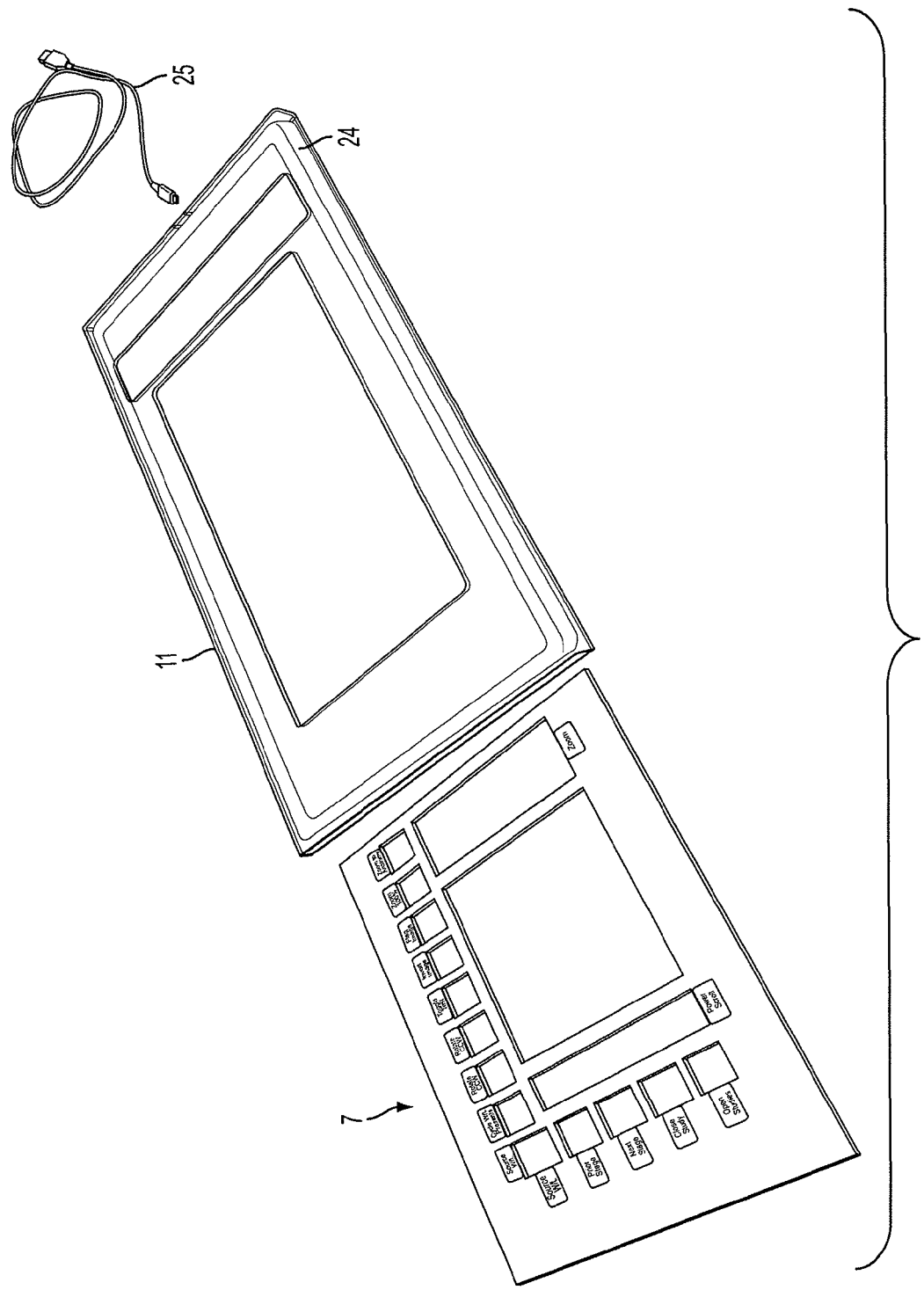
Figure 13:
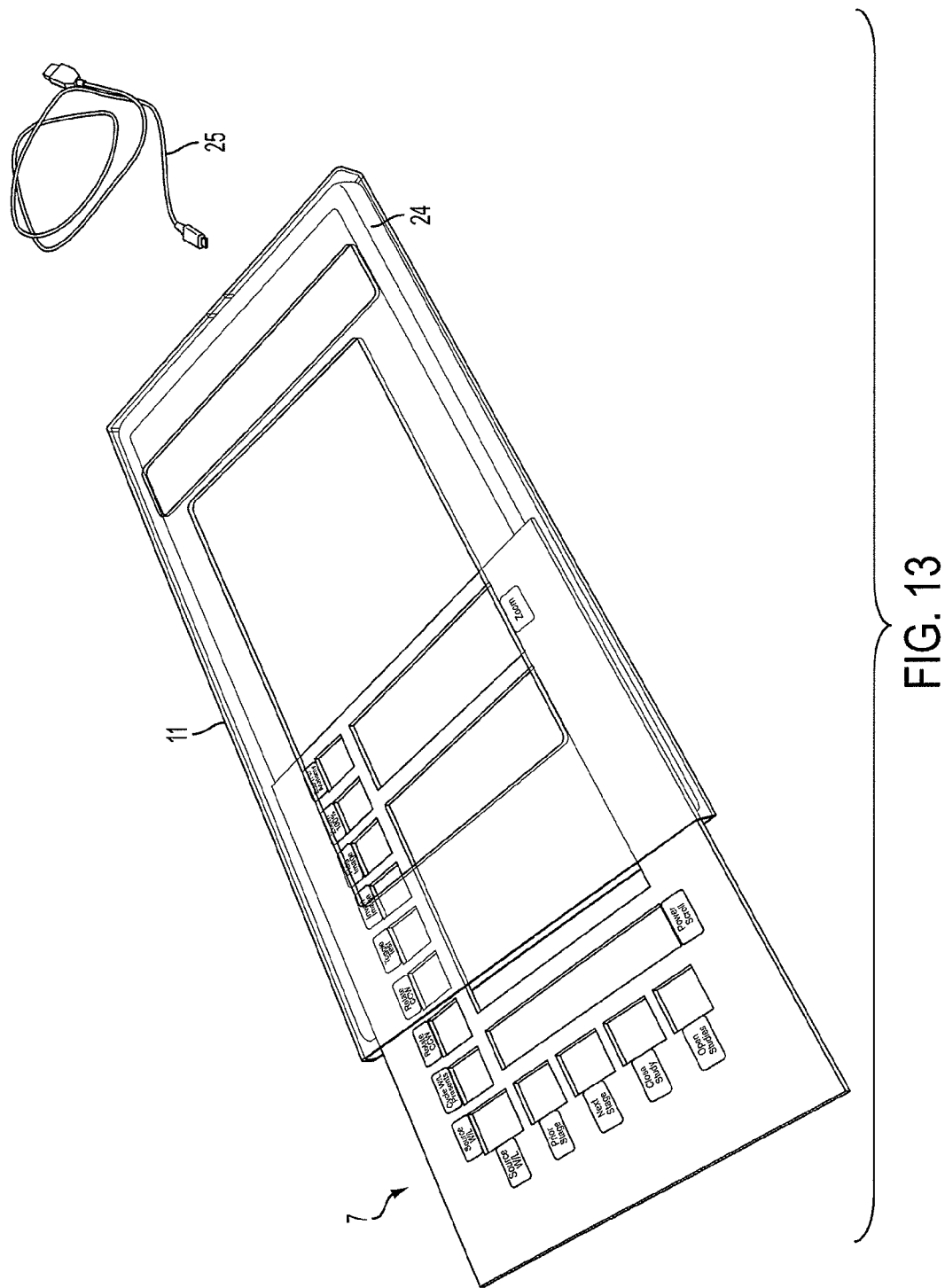
Figure 14:
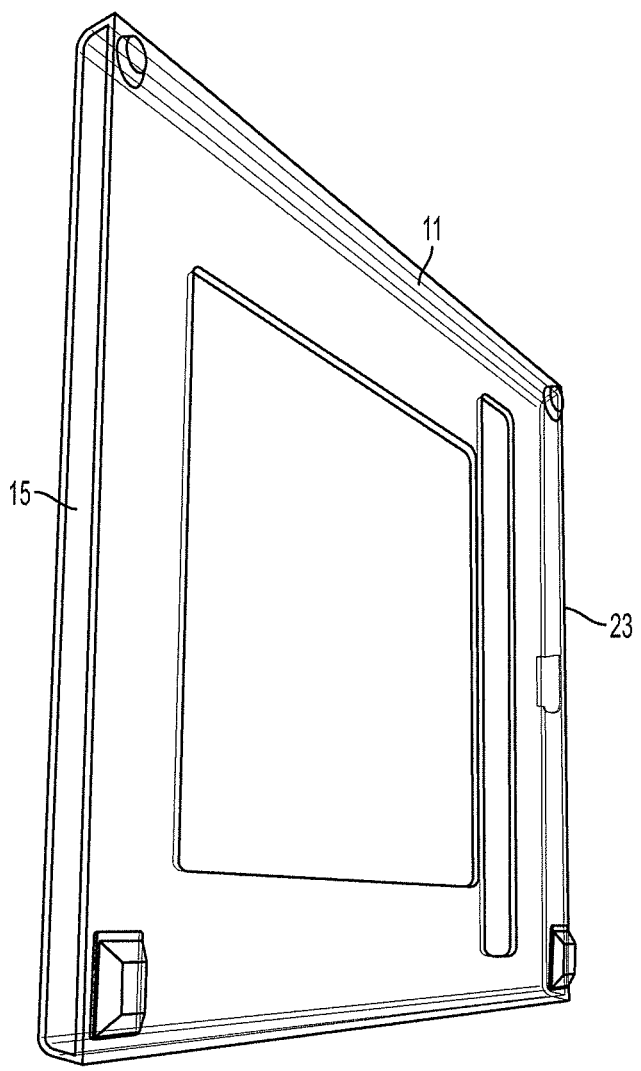
Figure 15:
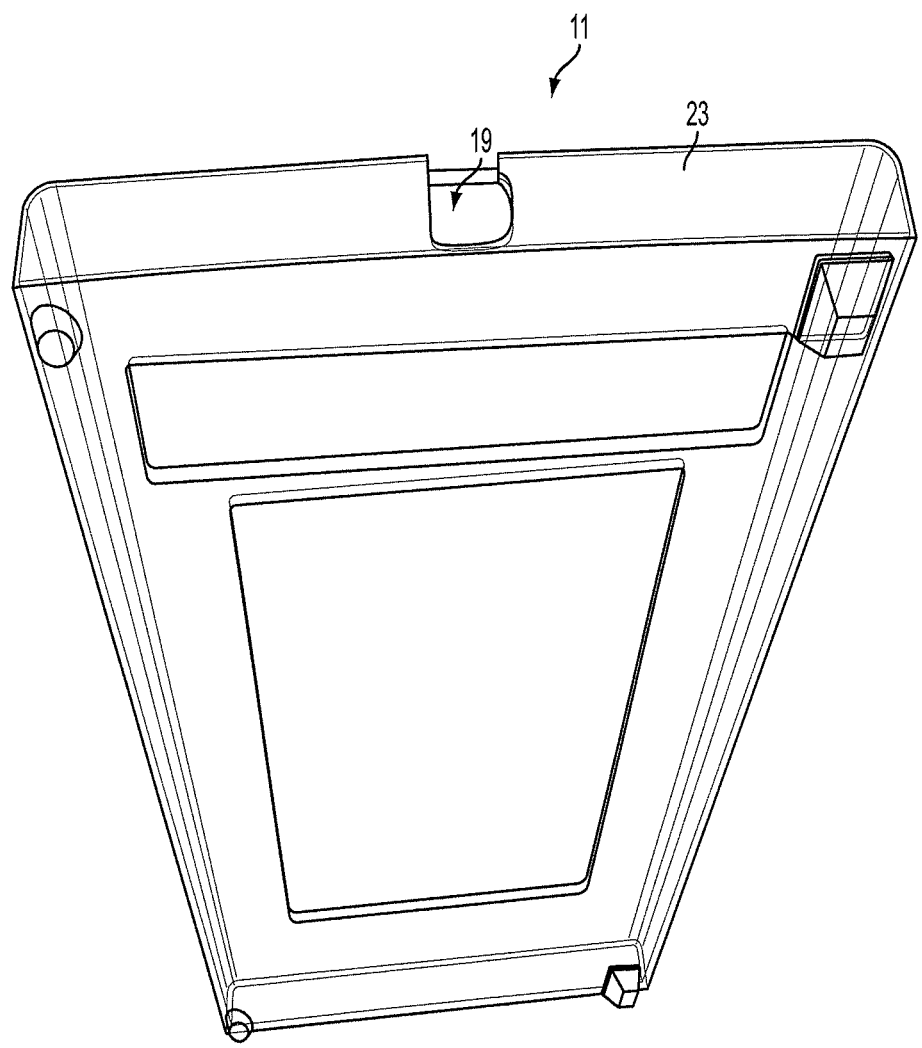

Having thus described the invention in general terms, reference will now be made to the accompanying drawings, which are not necessarily drawn to scale, and wherein:

FIGS. 1A and 1B are schematic block diagrams of apparatuses configured to operate in accordance with embodiments of the present invention;

FIGS. 2A and 2B are schematic block diagrams of a touch-sensitive surface and an object that may come into contact with that surface to effectuate a trace or movement interaction;

FIGS. 3 and 4 illustrate block diagrams of division of a touch-sensitive surface into a plurality of regions;

FIGS. 5A and 5B are diagrams illustrating overlay templates;

FIG. 6 is a diagram illustrating an overlay template overlaid on a touch-sensitive surface;

FIG. 7 is a schematic block diagram of a case for securely holding an overlay template and a touch-sensitive surface according to an exemplary embodiment of the present invention;

FIG. 8 is a block diagram of a case, according to an exemplary embodiment of the present invention;

FIG. 9 is a block diagram of a touch-sensitive surface securely inserted in a case according to an exemplary embodiment of the present invention;

FIG. 10 is a block diagram illustrating removal of a touch-sensitive surface and overlay template from a case, according to an exemplary embodiment of the present invention;

FIG. 11 is a block diagram illustrating a touch-sensitive surface, an overlay template and a connector separated from a case according to an exemplary embodiment of the present invention;

FIG. 12 is a diagram illustrating an overlay template positioned for insertion in a case that includes a touch-sensitive surface according to an example embodiment of the present invention;

FIG. 13 is a diagram illustrating insertion of an overlay template in a case according to an example embodiment of the invention; and FIGS. 14 and 15 are diagrams illustrating capped and open ends of a case according to example embodiments of the present invention.

DETAILED DESCRIPTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, references may be made herein to directions and orientations including vertical, horizontal, diagonal, right, left, up and down; it should be understood, however, that any direction and orientation references are simply examples and that any particular direction or orientation may depend on the particular object, and/or the orientation of the particular object, with which the direction or orientation reference is made. Like numbers refer to like elements throughout.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As described below, an apparatus of an exemplary embodiment of the present invention may include a case for securely holding a computing device having a touch sensitive surface, such as a tablet computer or other touch sensitive display surface, and an overlay template in an aligned relationship with the touch sensitive surface. The apparatus of exemplary embodiments of the present invention will be primarily described in conjunction with medical-imaging applications. It should be understood, however, that the apparatus of embodiments of the present invention can be utilized in conjunction with a variety of other applications, both in the medical industry and outside of the medical industry. Further, the apparatus of exemplary embodiments of the present invention includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention.

Generally, the apparatus of exemplary embodiments of the present invention may comprise, include or be associated with one or more computing devices having touch sensitive surfaces, such as the touch sensitive surfaces of one or more of a laptop computer, desktop computer, workstation computer, server computer, a mobile telephone, a personal digital assistant (PDA), a pager, a tablet computer or the like. In a more particular example, the apparatus may comprise, include or be associated with a Picture Archiving and Communication system (PACS) or other medical-imaging system workstation having a touch sensitive display surface.

Regardless of its configuration, the computing device having or otherwise associated with the touch-sensitive surface may include or otherwise be associated with a device of the type shown in FIG. 1A. As shown in FIG. 1A, the device 10 of one exemplary embodiment of the present invention may include a processor 12 connected to a memory 14. The memory can comprise volatile and/or non-volatile memory, and typically stores content, data or the like. In this regard, the memory may store content transmitted from, and/or received by, the apparatus. The memory may also store one or more software applications 16, instructions or the like for the processor to perform steps associated with operation of the entity in accordance with exemplary embodiments of the present invention (although any one or more of these steps may be implemented in hardware alone or in any combination with software and/or firmware). This software may include, for example, a gesture-recognition engine configured to receive and interpret data from a touch-sensitive surface for directing performance of one or more functions of the apparatus. In addition, the software may include software applications (e.g., medical-imaging software, Internet browser, etc.), one or more operations of which may be directed by the gesture-recognition engine (and, hence, the user of the apparatus via interaction with a touch-sensitive surface).

In addition to the memory 14, the processor 12 may also be connected to at least one interface or other means for displaying, transmitting and/or receiving data, content or the like. In this regard, the interface(s) may include at least one communication interface 18 or other means for transmitting and/or receiving data, content or the like, such as to and/or from other device(s) and/or network(s) coupled to the apparatus. In addition to the communication interface(s), the interface(s) may also include at least one user interface that may include one or more wireline and/or wireless (e.g., Bluetooth) earphones and/or speakers, one or more displays 20, and/or a user input interface 22. The user input interface, in turn, may comprise any of a number of wireline and/or wireless devices allowing the entity to receive data from a user, such as a microphone, an image or video capture device, a keyboard or keypad, a joystick, or other input device.

According to a more particular exemplary embodiment, the user input interface 22 may include a touch-sensitive surface and/or one or more biometric sensors. The touch-sensitive surface may be integral with or separate from a display 20, although it should be understood that even in instances in which the touch-sensitive surface is integral with a display (forming a touch-sensitive display), the apparatus 10 may additionally include a further display 8 (e.g., primary display) separate and distinct from the touch-sensitive display (e.g., reference display), as shown in FIG. 1B. The biometric sensor(s), on the other hand, may include any apparatus (e.g., image capture device) configured to capture one or more intrinsic physical or behavioral traits of a user of the apparatus such as to enable access control to the apparatus, provide presence information of the user relative to the apparatus, or the like.

Referring now to FIGS. 2A and 2B, the touch-sensitive surface 24 may be configured to detect (or otherwise capture) and provide data representative of points on the surface with which one or more objects come into contact (points of contact 26), and as well as the size of each point of contact (e.g., through the area of the contact point, the shadow size of the contact point, etc.). These objects may include one or more fingers 28 of one or both hands 30 of a user (or more generally one or more appendages of a user), as well as one or more objects representing instruments otherwise designed for use in paper-based systems. Objects representing instruments may include, for example, a stylus 32, pen or other similarly-shaped object (e.g., felt-tipped cone-shaped object) representing a writing instrument (e.g., grease pencil), a rectangular object representing a ruler, a closed-shaped (e.g., rectangular, circular, etc.) object representing a magnifying glass, or the like. Exemplary embodiments of the present invention may be described herein with respect to contact or movement of a finger or stylus relative to the touch-sensitive surface. It should be understood, however, that any finger contact or movement may alternatively be performed by a stylus; and similarly, any stylus contact or movement may alternatively be performed by a finger.

In accordance with exemplary embodiments of the present invention, the touch-sensitive surface 24 may be configured to detect points of contact 26 of one or more objects (e.g., fingers 28, stylus 32) with the surface. The touch-sensitive surface may be configured to detect points of contact in accordance with any of a number of different technologies. Examples of suitable touch-sensitive technologies include resistive, capacitive, surface acoustic wave, surface capacitance, projected capacitance, optical (e.g., infrared), strain gauge, dispersive signal, acoustic pulse recognition or other similar technologies. Other examples of suitable touch-sensitive technologies include force sensitive resistor (FSR), quantum tunneling composite (QTC), Stantum-type touch sensors (by Stantum of Bordeaux, France) or the like.

Upon detection of one or more points of contact 26, an accompanying gesture-recognition engine (software application 16), then, may be configured to receive and interpret data representative of those points of contact, and interpret those points of contact (including concatenated points of contact representative of a trace 34 as in FIG. 2A or movement 36 as in FIG. 2B) into commands or other instructions for directing performance of one or more functions of the device 10, or more particularly in various instances, functions of a software application operating on the device. In various instances, execution of these functions may effectuate a change in a graphical output presented by the display 20 during operation of the application. At any instant in time, the touch-sensitive surface and gesture-recognition engine may be capable of detecting and interpreting a single touch point (single-touch) or multiple simultaneous touch points (multi-touch).

In accordance with exemplary embodiments of the present invention, the touch-sensitive surface 24 may be divided into regions each of which is associated with a distinct set of one or more gestures and respective functions of the device 10 or software application for which the gesture(s) direct operation. The regions may but need not have a rectangular shape. The regions may be visibly represented by a removable physical graphic overlay (e.g. graphic overlay 7 of FIGS. 5A & 5B) for the touch-sensitive surface 24, or by an image presented on a display 20. In the instance of a physical graphic overlay, the overlay may include one or more bumps or projections intended to guide the user relative to the layout without requiring the user to keep an eye on the layout.

In either instance of visibly representing the regions, the regions may be visibly represented with an optional text label and/or iconic image shown to identify the functions associated with the respective regions. A general example of a touch-sensitive surface divided into regions 38 is shown in FIG. 3 (a particular example layout of which is described below), which also optionally includes guide bumps 39a, 39b; and a more particular example in the context of an application of a PACS workstation is shown in FIG. 4. As will be appreciated, the regions may be defined with any particular granularity. Any region may be further divided into sub-regions, which may be further divided into sub-sub-regions, and so forth. Similarly, any two or more regions may be grouped into a super-region, which may itself be grouped with one or more other regions into a super-super-region, and so forth. Thus, the following description with respect to regions may equally apply to sub-regions or super-regions.

Each region 38 may provide a mapping between a distinct set of one or more gestures (e.g., point(s) of contact 26, traces 34 and/or movements 36) and respective functions of the apparatus 10 or software application. That is, the gesture-recognition engine may detect one or more gestures as inputs, and in response thereto, direct respective functions of the apparatus or software application as outputs. The gestures within a set or across sets may be implemented in any appropriate sequence, or in various instances, multiple gestures may be implemented simultaneously. In the context of a PACS workstation, for example, gestures may be associated with imaging functions including but not limited to open a currently-selected study, close a study, zoom within an image, rotate image clockwise (CW), rotate image counterclockwise (CCW), flag image or the like. Through division of the touch-sensitive surface into regions, exemplary embodiments of the present invention may allow a user to more immediately access their common functions through gesturing on visible, and possibly labeled, regions.

In various instances, a region 38 may be associated with a single point of contact 26 (single-touch) or multiple simultaneous points of contact (multi-touch), and may be configured to require the point(s) of contact to have at least a threshold force value (force of contact of the finger(s) on the touch-sensitive surface 24)—ignoring points of contact having less than the threshold force value. Such a region may be considered a virtual button, and may have the capability of being activated with a configurable number of simultaneous touch points ($\geq 1$) and at a configurable force threshold. In some example embodiments, at least a portion of the region 38 may be configured for one or more virtual buttons and/or physical buttons.

In some example embodiments, if so desired, a single region 38 may be defined for the entire area of the touch-sensitive surface 24, or two or more regions may be defined so as to overlap. Additionally, in some example embodiments, different users may have different layouts of regions 38 for directing functions of the same or different software applications, such as to account for user preferences. Different applications may have different layouts, or different modes of operation of the same application may have different layouts. In the context of a PACS workstation, for example, different modalities of a medical imaging study may have different layouts, such as a computerized tomography (CT) study and mammography study having different layouts.

According to some exemplary embodiments of the present invention, a layout may have a physical graphical overlay with a set of one or more uniquely-placed, physical contacts that, when the overlay is placed on the touch-sensitive surface 24, may be detected by the touch-sensitive surface and interpreted by the device 10, such as the processor 12, to correspond to the respective layout. In such instances, the device may store configuration files for these layouts indexed according to the placement of their respective sets of contacts so that the desired configuration file may be recalled upon detection of a particular set of contacts. Even further, the locations of the regions 38 of the layout may be referenced to the contacts such that the physical graphical overlay may be placed in any of a number of positions and orientations on the touch-sensitive surface, and the device may determine the position and orientation of the overlay and its regions based on detection of the contacts. Thus, although the device may receive user input to designate a particular layout for operation, the device may automatically detect the particular layout—as well as its position and orientation on the touch-sensitive surface—as a function of the unique placement of contacts detected by the device.

Returning to the general example of FIGS. 3 and 4, a layout of regions 38 for directing operation of a software application may include regions 38 associated with shortcuts for carrying out various functions of the software application. The layout may also include regions associated with a Source W/L (region 38b), Cycle W/L presets (region 38c), Rotate image CCW (region 38d), Rotate image CW (region 38e), Toggle text (region 38i), Invert image (region 38g), zoom 10% (region 38i), zoom to fit (region 38j), Prior stage (region 38i), Next Stage (region 38m), Close study (region 38n), Open Study (region 38o), Power scroll (region 38p), and Zoom (region 38r). Even further, the layout may include a region 38q that may itself be further divided into sub-regions for operation as a virtual keyboard (each sub-region corresponding to a key), and may include a region for detecting a number of gestures for carrying out additional functions of the device 10—and possibly also for capturing free-form digital handwriting.

As suggested above, the layout of the regions 38 and their associated gestures and functions, as well as any other related parameters (e.g., applied force) and/or device or software application parameters (e.g., application windows to which functions may be directed), may be configurable and stored in a configuration file. The configuration file may define the regions of the layout in a coordinate space relative to the touch-sensitive surface 24, such as by defining x-y coordinate areas of the regions; and for each region, may specify a set of one or more gestures and associated functions (or actions). The configuration file may be formatted in any of a number of different manners, such as in an extensible markup language (XML) file including XML schema. A particular layout of regions may include a visible representation (e.g., physical graphic overlay or presented image) and configuration file, and multiple layouts may be selectively implemented by the device. Also, changes to the regions or their associated gestures or functions may be carried out by changing or replacing the configuration file, and similarly changing or replacing the visible representation of the regions such as, for example, a physical graphic overlay (e.g., overlay template 7 of FIGS. 5A & 5B) or a presented image.

Reference is now made to FIGS. 5A and 5B which illustrate an example embodiment of a physical overlay template for the regions 38 of FIGS. 3 and 4. In the example embodiment of FIG. 5A, the overlay template 7 may include a single layer corresponding to a thick mat paper layer or plastic layer 4 or the like, with holes cut out or otherwise formed for touch/gesture regions (e.g., touch gesture regions 38) of a touch sensing surface (e.g., touch sensing surface 24). As shown in FIG. 5B, the overlay template 7 may be overlaid on the touch-sensitive surface 24. In this regard, one or more fingers of a user may directly touch the touch sensing surface 24 through these holes, and the fingers of the user may feel the boundaries of each region by bumping up against the edges of the holes in the mat paper or plastic layer of the overlay template 7. The overlay template 7 may also have images, graphics, or text printed thereon or applied thereto with labels and/or decals. For example, the labels (e.g., invert image label 27a) may correspond to the functions (e.g., invert image) associated with the regions 38 (e.g., region 38g). As such, in an instance in which a user selects a region (e.g., region 38g) associated with a label (e.g., label 27a), the processor 12 of the device 10 may implement a corresponding function. In some example embodiments, the result of the implemented function (e.g., an inverted image) may be shown on a display (e.g., display 8). Although the overlay template 7 of the example embodiment of FIGS. 5A and 5B may include a mat paper layer or a plastic layer, it should be pointed out that the layers may include any other suitable materials other than paper or plastic without departing from the spirit and scope of the invention.

In another example embodiment, the overlay template 7 may be associated with or otherwise have two or more layers as shown in FIG. 6. For example, the overlay template 7 may include the mat paper or plastic layer 4, as well as a thin paper or plastic overlay layer 2 with no holes cut out which is arranged between the touch-sensitive surface 24 and the thicker mat paper or plastic layer 4. In this regard, one or more fingers of a user may not directly contact the touch sensitive surface, but may, instead, touch the layer 2 through the holes in the mat paper or plastic layer 4 with the layer 2, in turn, contacting the corresponding regions of the touch sensitive surface so as to provide the desired input. The layer 2 may also have text, graphics or images printed thereon. The layer 2 may provide touch feedback to the user to denote that one or more fingers of the user are in contact with or otherwise selecting a touch region(s) (e.g., regions 38).

The apparatus of an example embodiment of the present invention includes a case for maintaining the touch sensitive surface 24 and the overlay template 7 in an aligned relationship. Referring now to FIG. 7, a diagram illustrating a case 11 that secures the overlay template and the touch-sensitive surface is provided according to an example embodiment. As shown in FIG. 7, the overlay template 7 and the touch-sensitive surface 24 may be slid or moved through an opening defined by the case 11, such as an open end of the case 11 (also referred to herein interchangeably as gesture pad case 11 or tablet case 11). In this manner, the case 11 may securely hold the overlay template 7 in alignment relative to the corresponding regions (e.g., regions 38) of the touch-sensitive surface 24). By placing both the overlay template 7 and the touch-sensitive surface 24 within the case 11 in an aligned relationship, a user may more efficiently interact with the touch sensitive regions associated with the holes of the overlay template 7 since the overlay template 7 is held in place in an aligned relationship with the touch-sensitive surface and may not move about freely while in the case 11. As such, the case 11 is configured to hold the overlay template 7 in position securely against the touch-sensitive surface 24. However, the case 11 may also allow a quick change of the touch-sensitive surface 24 and/or the overlay template 7 when needed or desired.

Referring now to FIG. 8, a diagram illustrating a case 11 for securing an overlay template 7 and a touch-sensitive surface 24 is provided according to an example embodiment. The case 11 has an open end 15 to allow a touch-sensitive surface (e.g., touch-sensitive surface 24), such as a tablet computer having a touch-sensitive surface, and an overlay template to be inserted (e.g., slid within (e.g., a friction fit)) or removed from the case 11. In this regard, for example, the case may be open on one end and supports sliding the touch-sensitive surface and the overlay template 7 into the case 11. The touch sensitive surface and the template may be slid into the case at the same time or the touch sensitive surface and the template may be separately slid into the case. Once inserted into the case, the touch sensitive surface and the template may be maintained in an aligned relationship, such as using a friction fit. The case 11 also includes an opening 17 to access the sensing area of the touch-sensitive surface or tablet (e.g., via the overlay template 7). In addition, the case 11 is configured to include an opening(s) 29 to enable access to any physical buttons or virtual buttons proximate to the touch-sensitive surface, such as physical buttons of a tablet computer that are positioned proximate the touch sensitive surface. As such, in an instance in which an overlay template is not utilized the touch-sensitive surface or tablet may be utilized in a standard manner.

An overlay template (e.g., overlay template 7) and/or the touch-sensitive surface (e.g., touch-sensitive surface 24) or tablet may be slid out of the case 11 when needed or desired in response to a removal force applied by a user, but the case is otherwise designed to maintain the overlay template and the touch sensitive surface within the case in an aligned relationship. In this regard, normal usage may not cause the overlay template and/or the touch-sensitive surface or tablet to move within the case 11. Furthermore, the visual appearance of the case may be enhanced by applying one or more decals, or printed images (e.g., in paint or ink) that adhere to the case 11. The decals or printed design can include images, appealing graphics, branding/logos, or text. The case 11 may be clear or colored as desired. In one example embodiment, the case 11 may be formed of a plastic material. In other example embodiments, the case 11 may be formed of any other suitable materials, such as a composite material. The case 11 may also include one or more cutouts 21 to allow connection (e.g., via a connector (e.g., a cable)) to a touch-sensitive surface, such as to the tablet computer that includes the touch-sensitive surface, inserted within the case 11. In addition, the case 11 may include a closed or capped end 23, opposite the open end, to prevent inadvertent removal of the overlay and/or the touch sensitive surface.

Reference is now made to FIG. 9, illustrating a diagram of a touch-sensitive surface or a tablet securely inserted in a case according to an example embodiment. In the example embodiment of FIG. 9, the touch-sensitive surface 24 and the overlay template 7 may be included/inserted within the case 11. As shown in FIG. 9, the overlap template 7 may include labels (e.g., one or more labels 27) corresponding to and indicating one or more functions of respective touch regions 38 of the touch-sensitive surface 24. Moreover, a connector 25 (e.g., a cable) may be connected to the touch-sensitive surface 24 via cutout 19 of the case 11.

Reference is now made to FIG. 10, which illustrates removal of a touch-sensitive surface and overlay template from a case according to an example embodiment. In the example embodiment of FIG. 10, a touch-sensitive surface 24 and the overlay template 7, which is overlaid on the touch-sensitive surface 24, may be removed from the case 11 by sliding the touch-sensitive surface 24 and the overlay template 7 out of the case 11. In this manner, the connection between the touch-sensitive surface and the connector 25 may also be removed from the case 11 in response to being disconnected. As shown in FIG. 11, the touch-sensitive surface 24, the overlay template 7, the connector 25 and the case 11 may be separated in response to the removal of the touch-sensitive surface 24 and the overlay template 7 from the case 11.

Referring now to FIGS. 12 and 13, diagrams illustrating insertion of a touch-sensitive surface and an overlay template in a case is provided according to an example embodiment. In the example embodiment of FIG. 12, the touch-sensitive surface 24 is inside the case 11 and the overlay template 7 is positioned to be inserted in the case 11 and overlaid, or placed, on the touch-sensitive surface 24. As shown in FIG. 13, the overlay template 7 is being inserted in the case 11, for example, by sliding the overlap template 7 over the touch-sensitive surface 24 which is already inside the case 11.

Referring now to FIGS. 14 and 15, diagrams illustrating a case according to example embodiments are provided. In this regard, FIG. 14 illustrates a bottom or capped end 23 of the case 11 and an open end 15 of the case 11. FIG. 15 illustrates a bottom or capped end 23 of the case 11 from a different perspective and a cutout 19 of the case 11 for a connector (e.g., connector 25). In one example embodiment, the cases 11 of FIGS. 14 and 15 may be formed of a plastic material. In other example embodiments, the cases 11 may be formed of any other suitable material(s). In one example embodiment, the capped end 23 may be configured to contact an edge of the touch-sensitive surface 24 to restrict the touch-sensitive surface 24 from being moved further in a direction of the capped end 23.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a touch-sensitive surface that is divided into a plurality of regions associated with respective functions of a software application;
an overlay template placed on the touch-sensitive surface; and
a case constructed to receive the overlay template and the touch-sensitive surface through an opening defined thereby, the case defining at least one other opening enabling access to a sensing area of the touch-sensitive surface with which an object interacts,
wherein the overlay template defines the regions and a layout of the regions into which the touch-sensitive surface is divided,
wherein the overlay template defines a set of one or more uniquely-placed holes which, when the overlay template is placed on the touch-sensitive surface, enable the object to interact with corresponding touch regions of the touch-sensitive surface to trigger execution of a function associated with a respective touch region,
wherein the case is constructed to securely hold the received touch-sensitive surface and the overlay template in an aligned relationship with one another with the overlay template held against the touch-sensitive surface, and
wherein the case is constructed to enable removal of the overlay template from the case through the opening defined thereby by sliding the overlay template from the case while the touch-sensitive surface remains within the case and insertion of another overlay template by sliding the another overlay template into the case through the opening defined thereby so as to be placed on the touch-sensitive surface device that has remained inside the case.

2. The apparatus of claim 1, wherein:
the overlay template comprises a plurality of layers in which a first layer is formed of a paper or plastic material and defines the holes and a second layer is formed of a paper or plastic material that is free from holes and is arranged between the first layer and a top surface of the sensing area of the touch-sensitive surface device.

3. The apparatus of claim 1, wherein:
the case defines an open end to receive the overlay template and the touch-sensitive surface.

4. The apparatus of claim 1, wherein:
the case defines an opening configured to allow access to one or more physical or virtual buttons of the touch-sensitive surface.

5. The apparatus of claim 1, wherein:
the case defines a cutout configured to facilitate a connection between the received touch-sensitive surface and a connector.

6. The apparatus of claim 1, wherein the case is configured such that the touch sensitive surface is moved in a first direction to insert the touch sensitive surface into the case, and wherein the case comprises a capped end configured to contact an edge of the touch-sensitive surface to restrict the touch-sensitive surface from being moved further in the first direction.

7. The apparatus of claim 1, wherein the case is formed of a plastic material.

8. The apparatus of claim 1, wherein the overlay template comprises at least one layer formed of a paper or plastic material.

9. The apparatus of claim 1, wherein the touch-sensitive surface device comprises a tablet computing device.

10. An apparatus comprising:
a touch sensitive surface that is divided into a plurality of regions associated with respective functions of a software application;
an overlay template placed on the touch-sensitive surface; and
a case constructed to receive the overlay template and the touch-sensitive surface through an opening defined thereby, the case defining at least one other opening enabling access to a sensing area of the touch-sensitive surface with which an object interacts,
wherein the overlay template defines the regions and a layout of the regions into which the touch-sensitive surface is divided,
wherein the overlay template defines a set of one or more uniquely-placed holes which, when the overlay template is placed on the touch-sensitive surface, are aligned with corresponding touch regions of the touch-sensitive surface, and wherein the overlay template comprises a plurality of layers in which a first layer defines the holes and a second layer is free from holes and is arranged between the first layer and a surface of the sensing area of the touch-sensitive surface,
wherein the case is constructed to securely hold the received touch-sensitive surface and the overlay template in an aligned relationship with one another with the overlay template held against the touch-sensitive surface, and
wherein the case is constructed to enable removal of the overlay template from the case through the opening defined thereby by sliding the overlay template from the case while the touch-sensitive surface remains within the case and insertion of another overlay template by sliding the another overlay template into the case through the opening defined thereby so as to be placed on the touch-sensitive surface device that has remained inside the case.

11. The apparatus of claim 10, wherein
the first layer is formed of a paper or plastic material and the second layer is formed of a paper or plastic material.

12. The apparatus of claim 10, wherein:
the case defines an open end to receive the overlay template and the touch-sensitive surface.

13. The apparatus of claim 10, wherein:
the case defines an opening configured to allow access to one or more physical or virtual buttons of the touch-sensitive surface.

14. The apparatus of claim 10, wherein:
the case defines a cutout configured to facilitate a connection between the received touch-sensitive surface and a connector.

15. The apparatus of claim 10, wherein the case is configured such that the touch sensitive surface is moved in a first direction to insert the touch sensitive surface into the case, and wherein the case comprises a capped end configured to contact an edge of the touch-sensitive surface to restrict the touch-sensitive surface from being moved further in the first direction.

* * * * *